D. H. PACKARD.
Apparatus for Molding Box-Toes for Boots and Shoes.
No. 143,926. Patented Oct. 21, 1873.
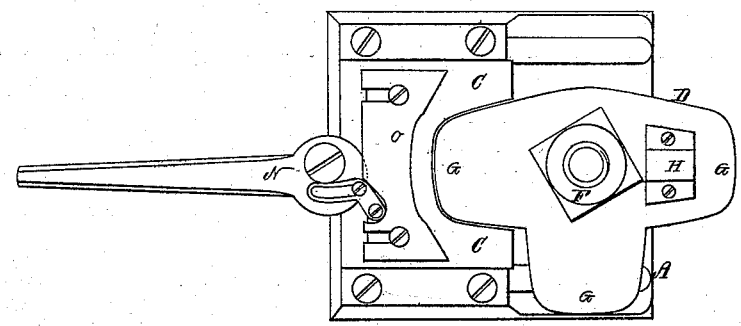
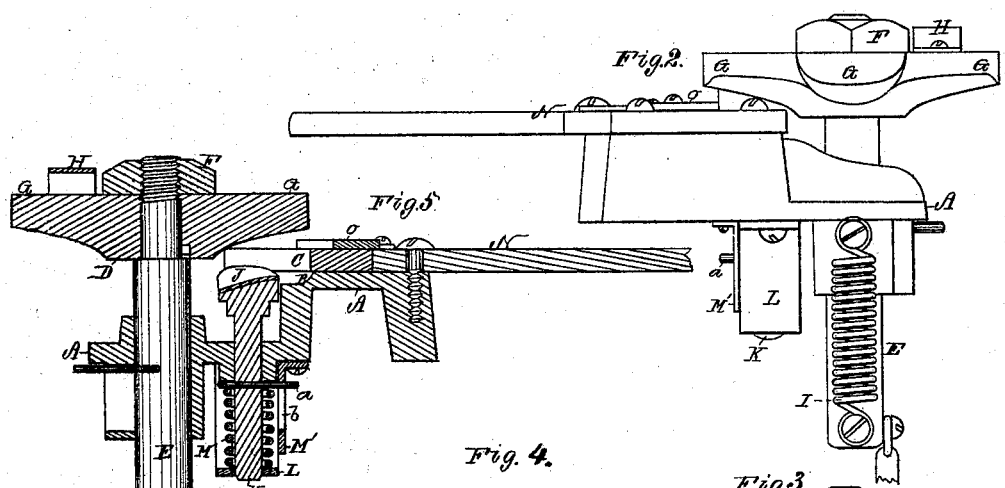
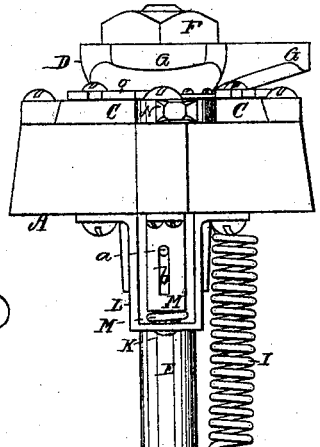
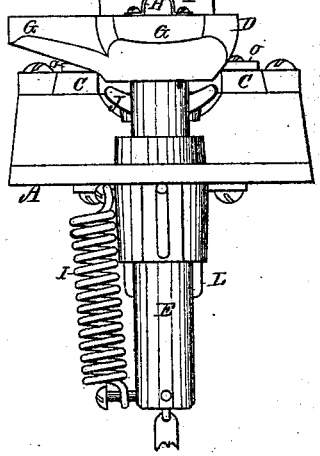

UNITED STATES PATENT OFFICE.

DAVIS H. PACKARD, OF NORTH BRIDGEWATER, MASSACHUSETTS.

IMPROVEMENT IN APPARATUS FOR MOLDING BOX-TOES FOR BOOTS AND SHOES.

Specification forming part of Letters Patent No. 143,926, dated October 21, 1873; application filed September 26, 1873.

*To all whom it may concern:*

Be it known that I, DAVIS H. PACKARD, of North Bridgewater, in the county of Plymouth and State of Massachusetts, have invented a new and useful Improvement in Apparatus for Molding "Boxes" for the Toes of Boots and Shoes; and do hereby declare the same to be fully described in the following specification and represented in the accompanying drawing, in which—

Figure 1 denotes a top view, Fig. 2 a side elevation, Fig. 3 a rear elevation, Fig. 4 a front elevation, and Fig. 5 a longitudinal section, of an apparatus embodying my invention. Fig. 6 is a view of a box-blank as cut from a sheet of card-board, and ready to be placed in the apparatus.

The object of my invention is to produce a simple and effective apparatus to be used in forming or molding boxes for the toes of boots and shoes, my invention being especially designed for the production of such articles from leather-board.

In the drawings, A denotes a strong metallic block or base, having a rectangular or other desirable shape in horizontal section, the said base being secured upon a table or other suitable support. Within this block is formed the female die, which is composed of two parts, B C, the part B being stationary and the part C movable, the latter being arranged to slide between ways or guides screwed to the base A, as shown in Fig. 1. D is the male-die block, which is mounted upon a cylindrical rod or standard, E, which slides vertically through the base, as shown in Fig. 5. This die-block is secured to the rod by means of a nut, F, which allows the die to be removed for being heated, as occasion may require. As shown in the drawing, the said block is formed with three male dies, G, of different forms, although but a single one is essential, as each requires a separate female die. H is a loop affixed to the top of the block, the same being to enable a bar or rod to be inserted, in order to remove or replace the block while in a heated state. As usually constructed, this block is provided with but a single male die, whose shape may be such as fancy may dictate; or the block may have two or more dies, as may be required. This die-block is forced upward into its highest position by means of a coiled spring, I, one end of which is attached to the base A and the other to the lower part of the rod E. In order to depress the die-block and die an ordinary treadle is connected to the rod by means of a pitman, as shown in Figs. 2, 3, and 4. Underneath the male die is a metallic plate, J, having a curvature corresponding with the under surface of such die. This plate is supported upon the top of a sliding rod, K, which extends down through the base A, and a U-shaped hanger, L, affixed to the bottom of the base, as shown in Fig. 2. M is a spring, which is coiled around the said rod, one end thereof resting on the base of the hanger and the other being connected with a stud, $a$, projecting from the rod and extending into a long vertical guide-slot, $b$, formed in a bar, M', as shown in Fig. 3. The object of this curved yielding plate is to clamp and hold the box-blank in place while the male and female dies are brought together to mold the blank. N is a cam-lever, which is pivoted to the front or top part of the base A, and is connected, by means of a slotted pitman, with the sliding part C of the female die, the object of making the part C movable being to retain the clamping action of the dies, and enable the male to rise into the position, as shown in Figs. 1, 2, 3, 4, and 5, and permit the box to be removed from the dies.

I would remark that, instead of the cam-lever, a screw or other device may be applied to the base to move the part C in and out.

Affixed to the upper surface of the part C is an adjustable curved gage, O, the same serving to determine the amount of material that is to be depressed to form the front of the box.

Having described my invention, its operation is as follows: If we suppose the parts to be in the position as shown in Fig. 1, and the male die to have been heated, and the box-blank to have been stamped out in the form as shown in Fig. 6, the blank is to be placed upon the plate C, (which serves as a table to support the blank,) with the part to constitute the front of the box resting against the gage-plate O. The male die is next to be moved downward by means of the treadle or other suitable motor, which, acting upon the blank, will bring it in contact with the clamp-plate J, the latter, by the stress of its spring, firmly maintaining the blank in its true position until the formative action of the male and female dies shall have given the desired form to the main portion of the box. The two fastening wings of the box are next bent down upon the top of the male die, and the article is completed, when, by drawing forward the movable part C of the female die, the male die will be so relieved of its wedging action as, by the resilient force of its spring, to rise into the position shown in Figs. 2, 3, 4, and 5, and thereby enable the box to be readily removed.

Having described my invention, what I claim is—

1. In an apparatus for forming boxes for the toes of boots and shoes the combination of the block D, having one or more male dies, G, the sliding clamp J, and the female die, formed in two parts, B C, the whole being constructed to operate as and for the purpose set forth.

2. The adjustable gage-plate O, in combination with the male die G, the clamp-plate J, and the female die B C, as and for the purpose set forth.

DAVIS H. PACKARD.

Witnesses:
F. P. HALE,
F. C. HALE.